United States Patent Office 3,050,539
Patented Aug. 21, 1962

3,050,539
PREPARATION OF FERRIC CHELATES OF ALKYLENE AMINO ACID COMPOUNDS
Robert Bruce Le Blanc, Lake Jackson, Tex., assignor to The Dow Chemical Company, Midland, Mich., a corporation of Delaware
No Drawing. Filed Oct. 20, 1959, Ser. No. 847,473
5 Claims. (Cl. 260—439)

This invention relates to a process for preparing the iron chelates of certain alkylene amino acid compounds, wherein the iron chelate carries the iron in the trivalent, ferric, form.

The usefulness of iron chelates of certain synthetic polyamino polycarboxylic acid compounds in plant culture has been rather fully annotated. In fact, it may be said that iron chelates in this form are accepted soil adjuvants and improvements in the technology of their use and manufacture reside in improving the effectiveness of the particular product it is desired to prepare. Commonly the solid iron chelate of hydroxyethylethylenediaminetriacetic acid, as sold in commerce, consists essentially of a mixture of the ferric and ferrous compounds accompanied by about 30 percent by weight of sodium sulphate, the entire composition containing only about 9 percent of chelated iron. This composition, under certain conditions, exhibits a substantial degree of phytotoxicity, while under corresponding conditions, neither sodium sulphate, nor ferric chelate, nor ferrous chelate alone exhibit the same degree of phytotoxicity. It would appear, therefore, that the phytotoxicity of the compound is related to the mixture of ferrous and ferric chelate, accompanied by the sodium sulphate.

It is, accordingly, a fundamental object of this invention to provide a method for the preparation of the iron chelates of certain hydroxyethyl amino acetic acid compounds, wherein the iron will be entirely found in the ferric form.

It is another object of the invention to provide a method for the preparation of the iron chelate wherein the amount of sodium sulphate is reduced to a minimum.

Other objects and advantages of the invention will in part be obvious and in part appear hereinafter.

The invention, accordingly, is embodied in a process for preparing a purified ferric chelate of hydroxyethylethylenediaminetriacetic acid, dihydroxyethylethylenediaminediacetic acid, hydroxyethyl glycine and dihydroxyethyl amino acetic acid, by reaction of ferrous sulphate and the alkali metal salts of the acetic acid compound, wherein substantially equimolar quantities of the chelating agent and ferrous sulphate are mixed together and sufficient water is added to form a 30–35 percent by weight solution of the amino acetic acid compound, whereupon the pH is adjusted to a range from 6 to about 7 with sulphuric acid, and air is blown through the solution to accomplish full oxidation of the ferrous iron. The solution is then cooled to a temperature of about 0 to 20° C., sodium sulfate crystallized, and, thereafter, filtered to remove the solid sodium sulphate. The iron chelate containing about 13 percent iron and about 5 percent sodium sulphate can then be recovered from the filtrate by any appropriate drying technique. It is to be understood, therefore, that the theory of the operation is to carry out the reaction between the ferrous sulphate and chelating agent in the presence of water in controlled amount, such that hydrated crystalline sodium sulphate is formed to remove the major contaminant from the iron chelate it is desired to prepare.

In general, in the past, the methods of producing iron chelates of hydroxyethylethylenediaminetriacetic acid wherein a direct stoichiometric mixture of the iron salt and the chelating agent is prepared yielded a product consisting essentially of the ferrous chelate with about 30 percent sodium sulphate and 9 percent chelated iron. Frequently in the use of this material in agricultural applications, it has been found to exhibit phytotoxicity under growth conditions where neither the sodium sulphate, ferric chelate nor ferrous chelate alone exhibited this degree of phytotoxicity.

The process which characterizes this invention overcomes this problem of phytotoxicity by improving the iron chelate in two directions, namely, by preparing it as essentially pure ferric chelate and by reducing the sodium sulphate content of the solid product. I have found that by controlling the concentration of ferric sulphate and chelating agent solution in water, the pH, and the temperature of separation, within rather narrow limits, and manipulating carefully, a product can be obtained which contains about 13 percent chelated ferric iron, a substantial increase in iron content over the conventional iron chelate, and less than about 3 percent of sodium sulphate. In general, therefore, the process consists of mixing approximately stoichiometric amounts of ferrous sulphate and the hydroxyethylethylenediaminetriacetic acid at a concentration such that in the combined solution, the amount of chelating agent will be 30–35 weight percent, thereupon adjusting the pH to 6–7 with sulphuric acid, and aerating the solution until the ferrous iron is oxidized to the ferric form. This solution is then cooled to a temperature approximating the range 0 to 20° C. and filtered to remove the sodium sulphate. In this operation, most of the sodium sulphate crystallizes, taking with it substantial quantities of water of crystallization. The solution remaining behind, namely, the filtrate, is the ferric chelate containing about 13 percent chelated iron.

Similarly, without significant alteration of conditions, the dihydroxyethylethylenediaminediacetic acid and dihydroxyethyl amino acetic acid may be employed to prepare the ferric chelates.

The process may be better understood by reference to the following specific example which outlines the details of the process.

EXAMPLE I

One mol (278 grams) of $FeSO_4.7H_2O$ was dissolved in 850 grams of a 41 percent solution of trisodium salt of N-hydroxyethylethylenediaminetriacetic acid. This represents a 2 percent excess of the chelating agent. The pH was adjusted to 6.5 with $H_2SO_4$. Water was added in some of the runs. Air was then blown through the solution for 30 to 45 minutes at ambient temperature to oxidize the iron to the ferric state, the solution was then cooled and filtered. The precipitate was not washed. The precipitate and filtrate were analyzed for iron chelate by polarographic methods and the filtrate was analyzed for sulphate by the standard $BaSO_4$ gravimetric method. The results of these runs are shown in the following table:

*Comparative Tests—Process per Example I*

PREPARATION OF Fe CHELATE

| Test No. | 3 | 5 | 7 | 9 | 10 |
|---|---|---|---|---|---|
| Water Added, grams | 200 | 100 | 0 | 0 | 0 |
| Filtration Temp., ° C | 11 | 24 | 28 | 15 | 9 |
| Weight Filtrate, grams | 942 | 953 | 930 | 743 | 758 |
| Percent Na Salt Fe Chelate in Filtrate | 35.9 | 36.5 | 35.2 | 44.9 | 44.3 |
| Percent $Na_2SO_4$ in Filtrate | 1.45 | 5.17 | 7.43 | 1.53 | 0.85 |
| Weight ppt., grams | 395 | 294 | 231 | 418 | 403 |
| Percent Na Salt Fe Chelate in ppt | 3.18 | 3.92 | 8.68 | 6.30 | 4.78 |
| Percent Yield Filtrate | 96 | 98 | 93 | 95 | 96 |

Following filtration to remove the sodium sulphate, the solution may be sold as produced or it may be spray dried to separate the solid ferric chelate. The process is quite specific to the reaction of ferrous sulphate with the hydroxyethylethylenediaminetriacetic acid, because other ferrous salts form sodium salts which are too water soluble and introduce substantial concentrations of extraneous ions into the solution carrying the iron chelate. Similarly, with respect to the adjustment of the pH of the solution, it is most desirable simply to restrict the acid to sulphuric acid, so that the only salt resulting therefrom is sodium sulfate.

EXAMPLES II and III

The same process is applicable to preparation of iron chelates of hydroxyethyliminodiacetic acid and dihydroxyethylaminoacetic acid. That is, the solubility properties of this group of chelating agents are such that they lend themselves to this operation conveniently.

In recapitulation, therefore, the process of this invention consists of conducting the reaction between ferrous sulphate in solution and hydroxyethylethylenediaminetriacetic acid at a concentration such that the total solution should contain 30–35 percent by weight of the hydroxyethylethylenediaminetriacetic acid. When in solution with the ferrous sulphate, the pH is adjusted to a range from about 5.5 to 7.5 with the preferred range from 6–7 and pH 6.5 approximately the preferred ideal level. Crystallization of the sodium sulphate is carried out at a temperature of about 0 to 20° C., preferably in the lower ranges of this temperature bracket. The actual aeration of the solution may be carried out at ambient temperature inasmuch as the compounds are quite stable and there is no danger involved in upsetting any equilibria by allowing the temperatures to go higher.

In general, it will be found that operations in accordance with the invention will give a yield of about 100 percent conversion of the ferrous iron to the ferric form and approximate recovery of about 95 percent of the iron chelate based on the amount of the chelating agent used. In general, the products will contain at least 10 and more likely approximately 13 percent chelated iron and less than 5 percent of sodium sulphate. That is, the amount of iron chelated in the product used will approximate 90 percent of theoretical, and will be at least about 75 percent of theoretical.

For utilization of the material, the iron chelate may be deposited on a carrier such as vermiculite simply by heating the vermiculite to a temperature of about 100 to 125° C. and spraying the iron chelate solution onto the vermiculite while stirring the vermiculite to develop complete exposure of its surfaces to the solution. When thus carried out, it is possible to deposit on the vermiculite an amount of the iron chelate which will be from 10 percent of the weight of the carrier to 100 percent of the weight of the carrier. That is, by heating the vermiculite, the ferric chelate solution is dried on it in situ to produce the ferric chelate on this desirable agricultural carrying agent.

Tests of these iron chelates in the field, when they are worked into the soil around growing plants have indicated that phytotoxicity of the material in the conventional doses is substantially eliminated.

What is claimed is:

1. The method of preparing an iron chelate of a chelating agent selected from the group consisting of hydroxyethylethylenediaminetriacetic acid, hydroxyethyliminodiacetic acid, hydroxy ethyl glycine dihydroxyethylaminoacetic acid, comprising, mixing a water solution of a sodium salt of the said chelating agent with an equimolar amount of a water solution of ferrous sulphate to form iron chelate desired and sodium sulphate by-product, aerating the solution while maintaining the total amount of water present in the reaction mixture at a level such that the concentration of the chelating agent is about 30–35 percent by weight of the total, thereafter cooling the combined solution to a temperature in the range from about 0 to 20° C., thereby crystallizing hydrated sodium sulphate, separating the iron chelate solution from said crystallized sodium sulphate and recovering the iron chelate.

2. The method in accordance with claim 1, in which the pH of the reaction solution is maintained within the range from 5.5 to 7.5.

3. The method in accordance with claim 1, in which the chelating agent is hydroxyethylethylenediaminetriacetic acid.

4. The method in accordance with claim 1, in which the chelating agent is hydroxyethyliminodiacetic acid.

5. The method in accordance with claim 1, in which the chelating agent is hydroxyethyl glycine.

References Cited in the file of this patent

UNITED STATES PATENTS 2,859,104    Kroll _____ Nov. 4, 1958

OTHER REFERENCES

Chaberek et al.: Science, vol. 118, September 4, 1953, page 280.

King et al.: College Chemistry, 2nd Edition (1954), page 515.